June 5, 1928.

H. G. ZOIA 1,672,636

APPARATUS FOR MAINTAINING TEMPERATURE OF FOODS PRIOR TO SERVICE

Filed Feb. 27, 1926

INVENTOR

Patented June 5, 1928.

1,672,636

UNITED STATES PATENT OFFICE.

HECTOR G. ZOIA, OF CLEVELAND, OHIO.

APPARATUS FOR MAINTAINING TEMPERATURE OF FOODS PRIOR TO SERVICE.

Application filed February 27, 1926. Serial No. 91,099.

This invention relates to the service of foods, and more particularly to a cabinet which is especially adapted for maintaining foods at a desired temperature during the interval between their preparation and their distribution. The cabinet referred to herein is conveniently formed as part of the wall or partition between a kitchen, or other place where food is prepared, and a dining or service room on the other hand.

It is the general purpose and object of the invention to provide a construction and arrangement of cabinet which will secure the foregoing results and advantages in a particularly efficient and advantageous manner.

Figure 1:
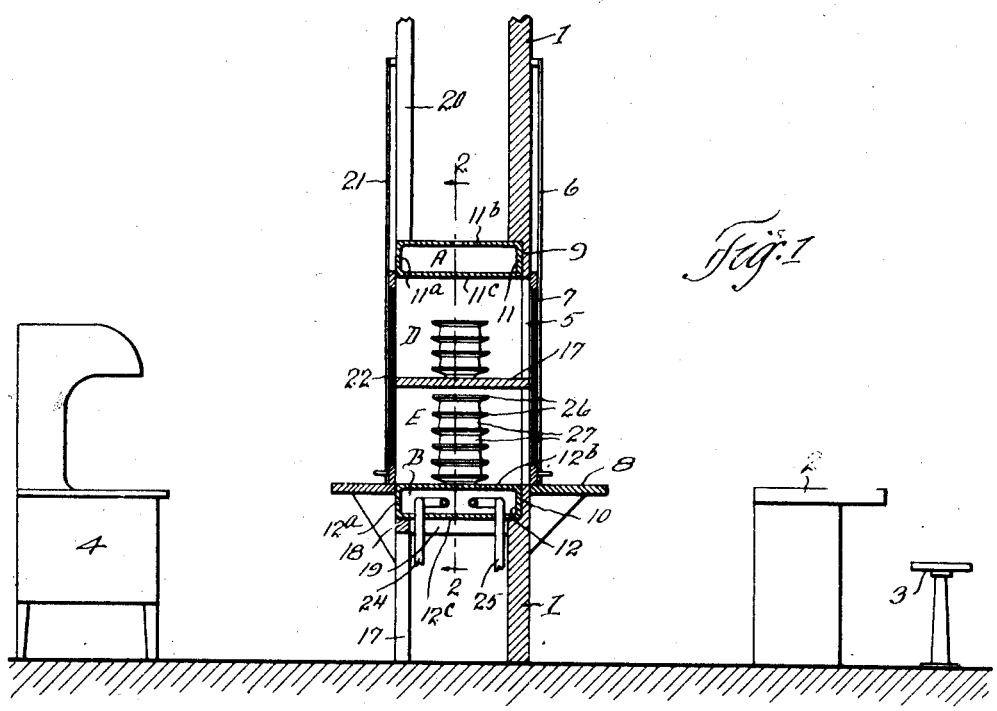
Figure 2:
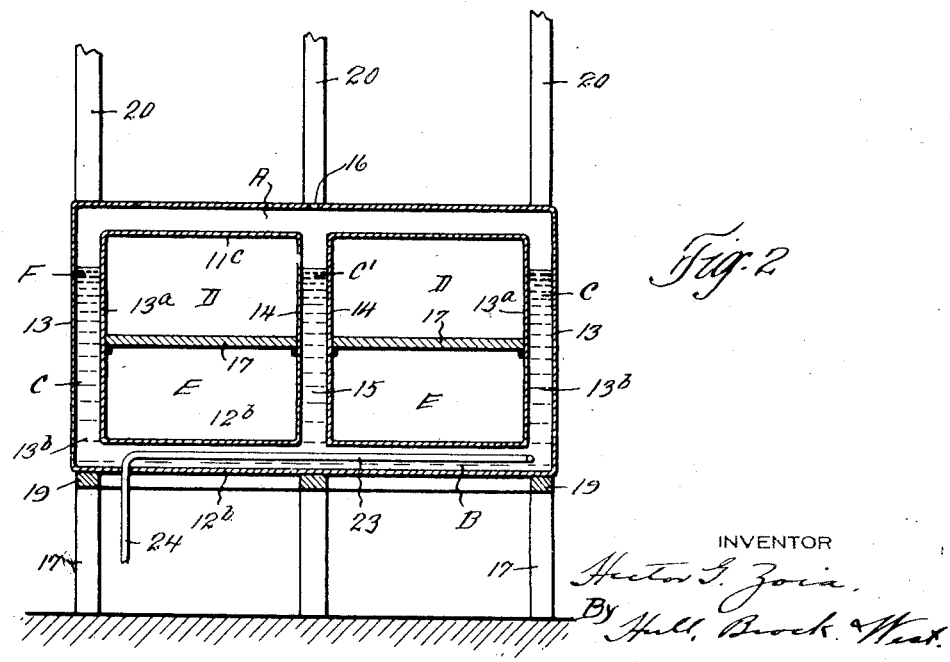

Further and more limited objects of the invention will appear hereinafter and will be realized in and through the construction and arrangement of parts shown in the drawings, wherein Fig. 1 represents a vertical sectional view through a wall or partition and through a cabinet of my design incorporated therewith, showing the arrangement of the cabinet with reference to a kitchen on the one hand, and a dining-room on the other hand; and Fig. 2 is a sectional view, corresponding to the line 2—2 of Fig. 1, the dishes being omitted.

Describing the various parts by reference characters, 1 denotes a wall or partition having on one side thereof a dining table or counter 2 with a stool 3 and on the other side a cooking range 4. The wall or partition is provided with an opening 5 therethrough and, on each side of said opening and across the middle thereof with vertical guides 6 for vertically sliding doors 7. Projecting outwardly from the wall at the bottom of the opening 5 is a shelf 8. Above, below and on each side of the opening 5, the wall or partition is provided with angular recesses 9 and 10 at the top and bottom respectively. The upper angular recess 9 receives the adjacent side 11 of the upper duct A of a fluid-containing receptacle while the lower notch 10 receives the corresponding adjacent side 12 of the lower duct B of said receptacle.

The fluid-containing receptacle referred to is preferably of the shape shown in the drawing and comprises the upper widened duct A formed between the side walls 11 and 11$^a$ and between the top and bottom walls 11$^b$, 11$^c$; the bottom widened duct B is of the same general shape as the upper duct and is formed between the side walls 12, 12$^a$ and the top wall 12$^b$ and bottom wall 12$^c$. In addition, the receptacle comprises widened vertical ducts C, C at the ends and a widened central duct C' connecting the top and bottom ducts. The vertical end ducts are formed between the vertical walls 13, 13$^a$ and a pair of end walls, one of which is indicated at 13$^b$. The vertical central duct is formed between walls 14 and a pair of side walls, one of which is indicated at 15. The top wall 11$^b$ is shown as provided with an aperture 16 for the escape of steam or other vapor. The construction provides an upper chamber D and a lower chamber E on each side of the central vertical duct C', the chambers D and E being separated by partitions 17. The side of the bottom duct B which is opposite the wall 1 and the bottom of said duct are supported in any suitable manner, as by means of uprights 17 and a longitudinal member 18 engaging the bottom adjacent to the side 12$^a$, together with cross members 19 extending across such bottom. Extending upwardly from the upper duct A are the vertical members 20 to which are secured the vertical guides 21 for the pair of doors 22, there being one such door for each pair of compartments D and E, as well as one door 7 for the opposite side of each such pair of compartments.

The receptacle formed by the ducts A, B, C and C' constitutes the top, bottom and ends of the compartments D and E, the sides of these compartments being ordinarily closed by the doors 7 and 22. The receptacle comprising the aforesaid ducts is adapted to receive a heating or cooling fluid. For ordinary kitchen-dining-room service, the receptacle will have a heating fluid therein; this fluid may be water which may be heated in any suitable manner, as by the use of burners (not shown) located below the bottom duct B, which burners may be employed in warm weather. In colder weather, in buildings where vapor, steam or hot-water systems are installed, the receptacle may be heated by the use of water therein, the water being heated by means of a suitable heating coil in the duct B, the said coil 23 having the connections 24 and 25 leading to the aforesaid heating system.

In the compartments D and E dishes are shown containing the articles of food to be served. These dishes will be inserted from the kitchen side through the doors 22 and may be stacked in the manner indicated.

When needed for service, they can be removed from the dining-room or service side through the doors 7, the doors being closed at times other than when the dishes are being inserted and removed.

While the cabinet shown herein may be used with ordinary dishes supported on racks, it has been found to be particularly useful with dishes comprising each a plate 26, and a heat-retaining ring 27 resting on said plate as a base and receiving the bottom of the plate 26 thereabove, employing preferably sealing construction between the top and the bottom of said ring and the said plates such as covered by my Patents 1,369,999, issued March 1, 1921 and 1,425,432, issued August 8, 1922. Where it is desired to serve cold dishes and to maintain them cold, this result may be secured by circulating a cooling medium through the coil 23.

Having thus described my invention, what I claim is:—

1. The combination, with a partition having an opening therethrough, of a cabinet fitted to said opening and having a chamber registering therewith, a door for said opening carried by said partition, a door for the opposite side of said chamber, and means for maintaining a desired temperature within said chamber.

2. The combination, with a partition having an opening therethrough, of a cabinet having a chamber registering therewith, a door for said opening carried by said partition, a door for the opposite side of said chamber, a receptacle for heating said chamber fitted to the part of the partition surrounding the opening therethrough and extending about the top, bottom and ends of the chamber, and means for maintaining a desired temperature in said receptacle.

3. The combination, with a partition having an opening therein, of a cabinet having one side fitted to said opening and provided with a chamber registering with said opening, a door for said opening carried by said partition, a door for the opposite side of said chamber, shelves projecting from the bottom of each side of said chamber, and a fluid-containing receptacle extending about the top, bottom and ends of the chamber.

4. The combination, with a partition having an opening therein, of a cabinet having one side fitted to said opening and having a chamber registering with said opening, a door for said opening carried by said partition, a door for the opposite side of said chamber, shelves projecting from the bottom of each side of said chamber, and means cooperating with the top, bottom and ends of the chamber for maintaining a desired temperature therewithin.

5. The combination, with a partition having an opening therethrough and provided with recesses therewithin and extending respectively above and below said opening, of a cabinet comprising an upper and a lower fluid container having sides fitted into said recesses respectively and provided between said containers with one or more chambers extending transversely therethrough and registering with said opening, a door for one side of the cabinet carried by said partition, and a door for the opposite side of said cabinet.

6. The combination, with a partition having an opening therethrough, of a cabinet having a chamber registering with said opening and a receptacle for heating said chamber surrounding the same and fitted to a recess in said partition surrounding said opening, a support additional to said partition for the opposite side of the bottom of said cabinet, a door for one side of the cabinet carried by said partition, a door for the opposite side of said cabinet, and shelves carried respectively by the said partition and the said support and projecting outwardly from opposite sides of the bottom of the said chamber.

In testimony whereof, I hereunto affix my signature.

HECTOR G. ZOIA.